US007603272B1

United States Patent
Hakkani-Tur et al.

(10) Patent No.: US 7,603,272 B1
(45) Date of Patent: *Oct. 13, 2009

(54) SYSTEM AND METHOD OF WORD GRAPH MATRIX DECOMPOSITION

(75) Inventors: Dilek Z. Hakkani-Tur, Morris Plains, NJ (US); Giuseppe Riccardi, Hoboken, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 11/765,008

(22) Filed: Jun. 19, 2007

Related U.S. Application Data

(63) Continuation of application No. 10/405,535, filed on Apr. 2, 2003, now Pat. No. 7,277,850.

(51) Int. Cl.
*G10L 15/00* (2006.01)
(52) U.S. Cl. ............... 704/232; 704/243; 704/244; 704/256
(58) Field of Classification Search ............. 704/232, 704/243, 244, 256
See application file for complete search history.

(56) References Cited

U.S. PATENT DOCUMENTS

| 5,799,276 | A | * | 8/1998 | Komissarchik et al. ...... 704/251 |
| 6,205,261 | B1 | | 3/2001 | Goldberg |
| 6,931,374 | B2 | | 8/2005 | Attias et al. |
| 7,379,870 | B1 | * | 5/2008 | Belvin et al. ............ 704/255 |
| 2002/0032549 | A1 | | 3/2002 | Axelrod et al. |
| 2003/0191625 | A1 | * | 10/2003 | Gorin et al. ............... 704/1 |
| 2005/0149326 | A1 | * | 7/2005 | Hogengout et al. ........ 704/242 |
| 2008/0059153 | A1 | * | 3/2008 | Bennett ...................... 704/9 |

OTHER PUBLICATIONS

Bangalore et al., "Computing Consensus Translation From Multiple Machine Translation Systems", IEEE, 2002, pp. 351-355.
Gretter et al., "On-Line Learning of Language Models with Word Error Probability Distributions", IEEE, 2001, pp. 557-560.
Mangu et al., "Finding consensus in speech recognition: word error minimization and other applications of confusion networks", Computer Speech and Language, 2000, vol. 14, pp. 373-400.
Hakkani-Tur et al., Active Learning for Automatic Speech Recognition, IEEE, 2002, pp. IV-3904-IV-3907.
Hakkani-Tur et al., "A General Algorithm for Word Graph Matrix Decompositions", AT&T Labs Research, Apr. 2003, 4 pages.

* cited by examiner

*Primary Examiner*—Daniel D Abebe

(57) ABSTRACT

Disclosed is a system and method of decomposing a lattice transition matrix into a block diagonal matrix. The method is applicable to automatic speech recognition but can be used in other contexts as well, such as parsing, named entity extraction and any other methods. The method normalizes the topology of any input graph according to a canonical form.

21 Claims, 3 Drawing Sheets

SYSTEM AND METHOD OF WORD GRAPH MATRIX DECOMPOSITION

This application is a continuation of Ser. No. 10/405,535, filed Apr. 2, 2003, the contents of which is incorporated herein by reference in its entirety.

BACKGROUND OF THE INVENTION

1. Field of the Invention

The present invention relates to automatic speech recognition modules and more specifically to a system and method of decomposing a lattice transition matrix into a block diagonal matrix.

2. Introduction

A lattice is a mathematic structure that compactly describes sequences of discrete events. The present invention is disclosed in the context of one of many uses of lattices. In large vocabulary continuous speech recognition (LVCSR), the word search space, which is prohibitively large, is commonly approximated by word lattices. Usually these word lattices are acyclic and have no a-priori structures. Their transitions are weighted by acoustic and language model probabilities. More recently a new class of normalized word lattices has been proposed. These word lattices (a.k.a. sausages) are more efficient than canonic word lattices and they provide an alignment for all the strings in the word lattices. The present invention relates to a general framework for lattice chunking. One way to characterize the present invention is the pivot algorithm or method. In terms of state transition matrix, the present invention corresponds to decomposing the lattice transition matrix into a block diagonal (chunk) matrix.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

In terms of automatic speech recognition, sausages are very efficient and they provide a normalization or chunking of the lattice by aligning words from all possible hypotheses. The present invention relates to a system and method of providing a general framework for lattice chunking. The method is referred to herein as the pivot algorithm. There are four important components of the pivot algorithm. First, the time information is not necessary but is beneficial for the overall performance. Second, the algorithm allows the definition of a predefined chunk structure of the final word lattice. Third, the algorithm operates on both weighted and unweighted lattices. Fourth, the labels on the graph are generic and could be words as well as part of speech tags or parse tags.

While the algorithm has applications to many tasks (e.g., parsing, named entity extraction), the invention is described herein with reference to speech recognition results on the performance of word confidence scores for different large vocabulary speech recognition tasks. When compared with the results of our algorithms against off-the-shelf methods, the present invention shows significant improvements.

Figure 1:
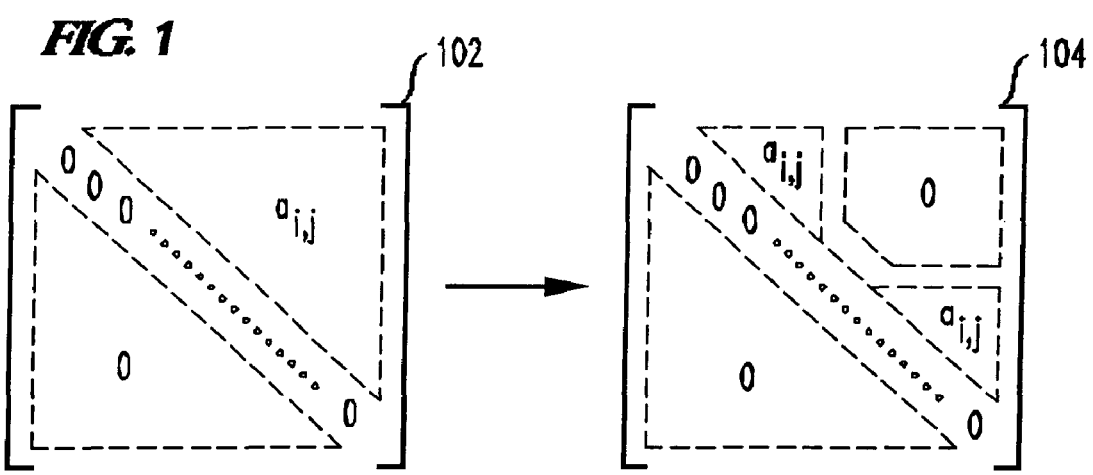
FIG. 1. illustrates state transition matrices for topologically sorted traditional lattices and pivot alignments.

FIG. 1 shows the state transition matrices for topologically sorted traditional lattices and the new type of lattices we propose, the pivots. The elements are binary: 1 if there is at least one transition between states i and j and 0 if otherwise. As used herein, the equivalence class of state transitions from state i (102) to state j (104). The state transitions $a_{i,j}$ can be weighted or unweighted. In the weighted case, the cost associated to the transition from state i to state j and with label wk is $c_{i,j}^{wk}$.

As mentioned above, there are four important components of the pivot algorithm: 1) the time information computed using the frame numbers is not necessary but is beneficial for the overall performance (the timing information is expressed in the states of the word lattice and corresponds to frame numbers of the speech files or the audio files.); 2) the algorithm allows the definition of a predefined chunk structure for the final lattice; 3) the algorithm operates on both weighted and unweighted lattices; and 4) the labels on the graph are generic and could be words as well as part of speech tags or parse tags.

The method is described herein in the context of automatic speech recognition (ASR). Lattice chunking has the clear advantage of normalizing the search space of word hypotheses. The advantages of these normalized lattices are in terms of memory and computation. In terms of memory, the resulting structures (pivots) are much smaller in size (order of magnitudes), while preserving accuracy of the original search space. In terms of computation, the normalized matrices have the compositional property. Suppose that one wants to compute the word string with lowest weight, $C_{min}$, among all strings $W = w_1, \ldots, w_k, \ldots w_N$ in the lattice:

$$C_{min} = \min_{W} \sum_{w_k} c_{i,j}^{wk} = \sum_{m_l} \min_{Wl} \sum_{v_k} c_{i,j}^{vk} \qquad (1)$$

where $Wl = v_1, \ldots v_k, \ldots v_M$ is the set of word strings recognized by the $l_{th}$ lattice chunk, $m_l$.

There are many applications where these properties have been very useful. In the case of weighted lattices, the transition probabilities on the pivots can also be used as word confidence scores. The posterior probabilities on the most probable path of the resulting pivot alignment have been used as confidence scores for unsupervised learning of language models and active learning for ASR. The pivot structure of competing word hypotheses, as well as their confidence scores, have been used for improving spoken language understanding, machine translation and named entity extraction. The compositional property has been extended to the case of weighted string costs. Presented herein is the application of the pivot algorithm to the computation of word confidence scores for all the strings in a word lattice. Although not limited to this context, results are presented herein on the performance of confidence scores for a large vocabulary continuous speech recognition task.

Figure 2:
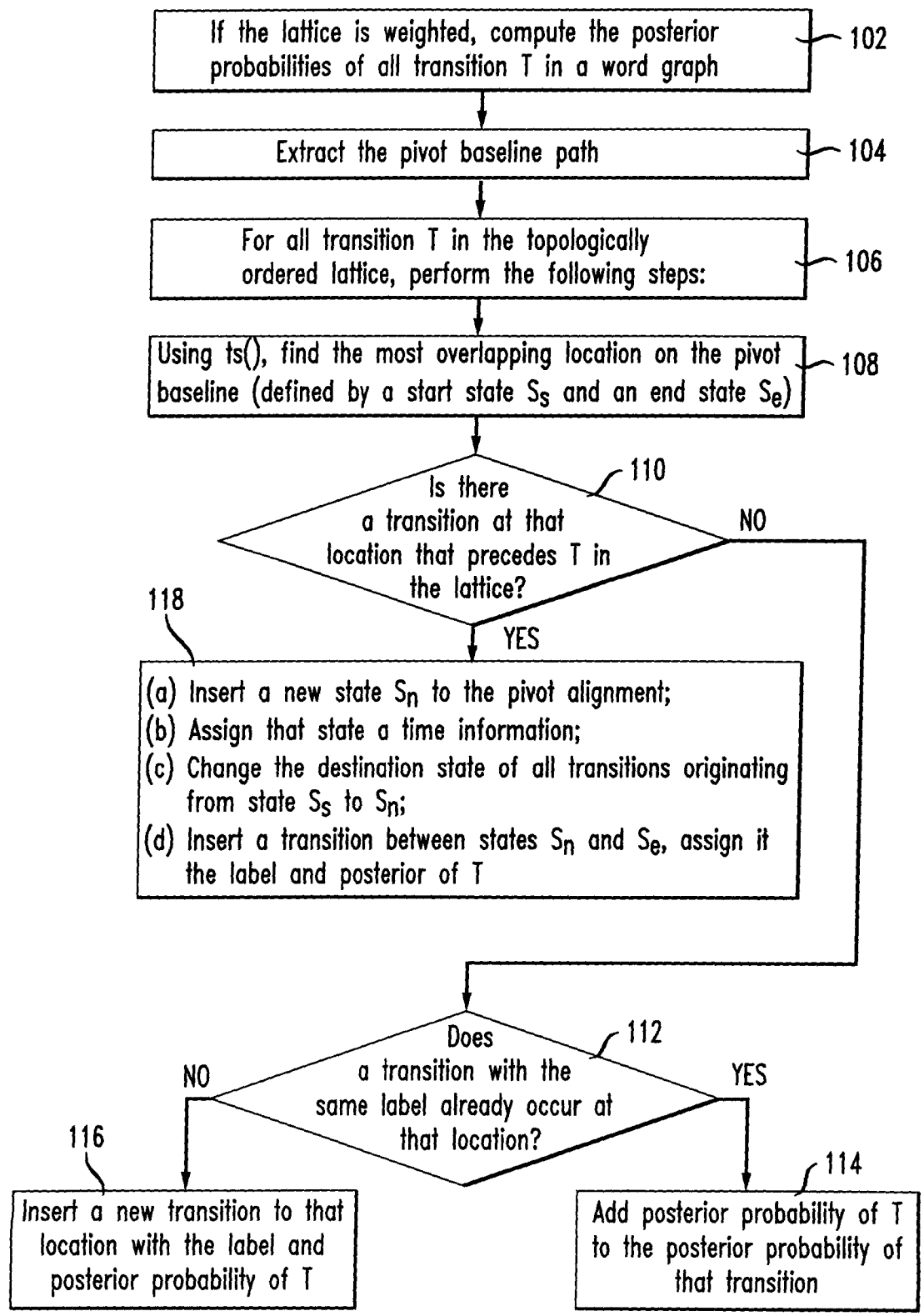
FIG. 2 is a flowchart illustrating the method according to an embodiment of the invention.

The sausage algorithm that has been proposed by others is designed to reduce word error rate and is thus biased towards automatic speech recognition. The pivot algorithm according to the present invention is general and aims to normalize the topology of any input graph according to a canonic form. FIG. 2 provides a flowchart illustrating the method embodiment of the invention. If the lattice is weighted, the method comprises computing the posterior probability of all transitions in the word graph (102). This can be accomplished by doing a forward and a backward pass through the graph or by other means. At this point, the posterior probability of a transition could be used as a confidence score by itself, but some improvements are possible by taking into account the competing hypotheses in the same time slot. In the case of unweighted lattices, this step can be skipped. The method next comprises sampling a sequence of states that lie on a path from the lattice to use as the baseline of the pivot alignment (104). This step can be described as extracting the pivot baseline path. A path is a sequence of state transitions from the initial state to a final state.

The pivot baseline can be the best path or the longest path of the lattice, as well as any random path. The process of extracting the pivot baseline path from the lattice can be accomplished in many different ways. Further, the pivot baseline path is not a unique point or set of points in the word lattice. For example, in most experiments performed by the inventors, either the best or the longest path was used. Thus, the pivot baseline can be extracted in numerous ways and can represent different data.

The states on the pivot alignment baseline are assumed to inherit their time information from the lattice. According to the present invention, the time information is not necessary, but is beneficial for the overall performance. A time slot ts(T) of transition T is defined as the speech interval between the starting and ending time frames of T.

For all transitions T in the topologically ordered lattice, the steps described below are taken (106). In the lattice, each transition overlapping ts(T) is a competitor of T, but competitors having the same word label was T are allies. All the posterior probabilities of the allies of transition T are summed to obtain what is called a posterior probability of word w. The rationale of this operation is to try to avoid missing the important contribution of the same word, often due to very small differences in alignment. To compute the sum of the posterior probabilities of all transitions labeled with word w that correspond to the same instance, the lattice in a topological order is traversed and the method inserts all transitions into the pivot alignment baseline, finally forming the pivot alignment. The method next comprises finding the most overlapping location on the baseline (108), defined by a source and a destination state.

Continuing with the description of the flowchart of FIG. 2, the method queries whether there is already a transition at the location that precedes T on a path in the lattice (110). Insertion of T at that location would hurt the topology of the lattice. If there is no such transition, the method checks if another transition with the same label already occurs in between those two states (112). In the presence of such a transition, the method increments its posterior probability by the posterior probability of the new transition (114). In the absence of a transition with the same label, the method creates a new transition from the source to destination state, with the label and the posterior probability of the currently traversed transition on the lattice (116).

Returning back to step 110, if the topology of the lattice would be hurt by the insertion of T to that location, the method creates a new location by inserting a new state in between source and destination (118). The method adjusts all the transitions to the destination state by making them point to the newly inserted state and inserts the current transition from the lattice in between the newly created state and the destination state (118). In the preferred embodiment of the invention, the newly inserted state is assigned the mean of the times of source and destination states as a location.

When the time information is not available, the method assigns each state of the lattice its approximate location on the overall lattice. According to this, the initial state is assigned a location 0 and the final states that do not have any outgoing transition are assigned a location 1. All the other states in between are assigned a real number in (0, 1), obtained by dividing the average length of all paths up to that state by the average length of all paths that go through that state. These numbers can be computed by a forward and a backward pass through the lattice. The inventors prefer to use these approximate state locations to obtain ts(T). In an initial state, ts(T)=0 and in a final state, ts(T)=1. The pivot algorithm runs in $O(n \times k)$ time, where n is the number of state transitions in the lattice and k is the number of chunks in the resulting structure, which usually is much less than n. For example, if the best path is used as the pivot baseline, then k is the length of the best path plus the number of state insertions made.

Figure 3:
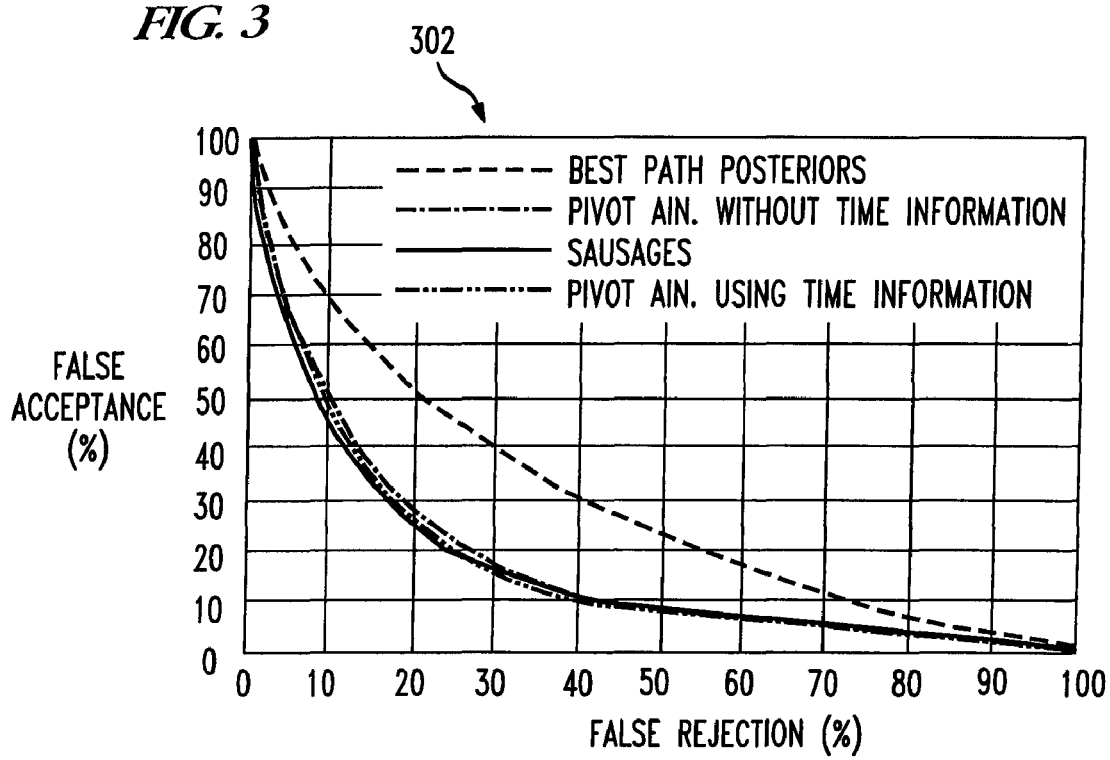
FIG. 3 is a graph illustrating receiver operating characteristic (ROC) curves for word confidence scores.

The inventors performed a series of experiments to test the quality of the pivot alignments and the confidence scores on them. These experiments used a test set of 2,174 utterances (31,018 words) from the database of the AT&T's "How May I Help You?" system for customer care (HMIHY). The language models used in all the experiments are trigram models based on Variable N-gram Stochastic Automata. The acoustic models are subword unit based, with tri-phone context modeling and variable number of Gaussians (4-24). The word accuracy of the test set when recognized with these models is 66.2%, and the oracle accuracy of the output lattices is 85.7%. Oracle accuracy is the word accuracy of the path in the lattice closest to the reference sequences. It is an upper-bound on the word accuracy that can be obtained using these lattices. To assess the quality of confidence scores on pivot alignments, the inventors plot ROC curves of false rejection versus false acceptance. False rejection is the percentage of words that are correctly recognized in the ASR output but are rejected as their confidence score is below some threshold. False acceptance is the percentage of words that are misrecognized but are accepted as their confidence score is above that same threshold. False rejection and false acceptance are computed with various thresholds to form the ROC curve. FIG. 3 illustrates a plot of the ROC curves for four different types of confidence scores: the posterior probabilities of the transitions on the best path of the lattice, the most likely path of the pivot alignments using approximate time information, consensus hypotheses of sausages, and the most likely path of the pivot alignments using time information. Both pivot alignments and sausages result in better confidence scores than the approach of using the posterior probabilities on the best path of the lattice. As shown in FIG. 3, although the pivot alignments using time information were generated in much less time than sausages, their ROC curve is almost overlapping with the one obtained using sausages. When the time information is not available, the ROC curve for the pivot alignments is only slightly worse than the one obtained using time.

Figure 4:
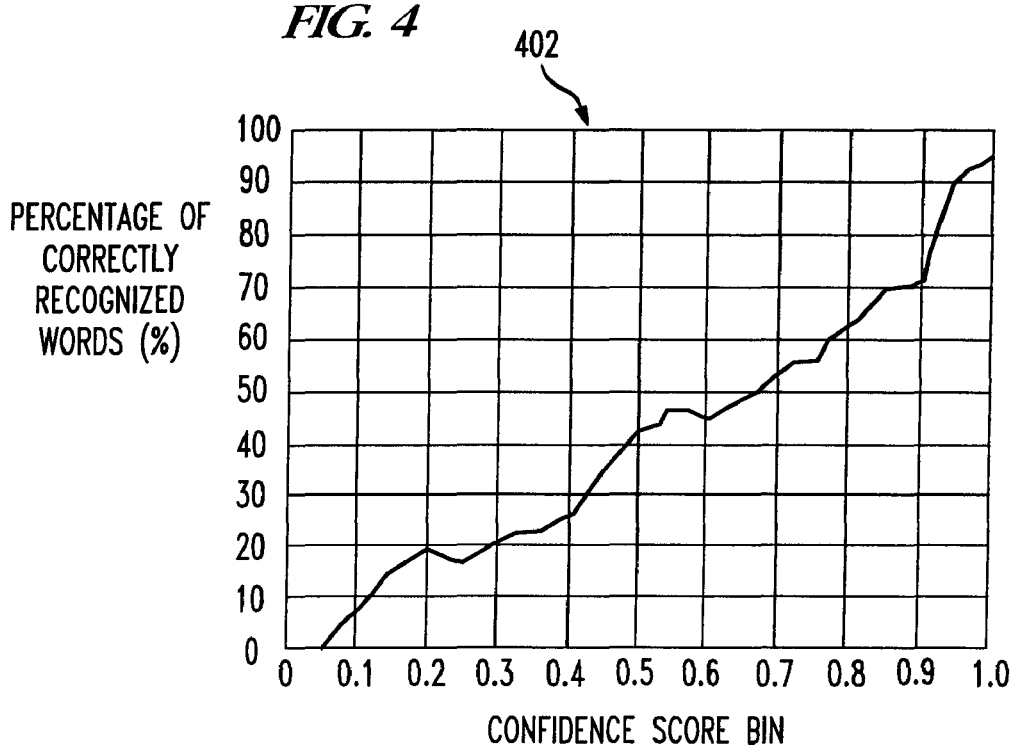
FIG. 4 is a graph illustrating a percentage of correctly recognized words in confidence score bins on the best path of pivot alignments computed without using time information.

Another method for testing the quality of the confidence scores is checking the percentage of correctly recognized words for given confidence scores. One may expect k % of the words having the confidence score of k/100 to be correct. FIG. 4 shows a graph 402 illustrating the results using confidence score bins without using time information. As seen, the percentage of correctly recognized words in each confidence score bin increases almost linearly as the confidence score increases.

To assess the quality of the pivot alignments, the inventors computed oracle accuracies after pruning the pivot alignments with two different criteria. In Table 1, the oracle accuracies after pruning the pivot alignments by using a threshold for posterior probability are presented.

TABLE 1

| k | Oracle Accuracy |
|---|---|
| 0.4 | 67.5% |
| 0.2 | 70.8% |
| 0.1 | 74.2% |
| 0.05 | 77.0% |
| 0.01 | 81.2% |
| 0 | 86.7% |

Any arc that has a posterior probability less than k has been pruned from the pivot alignment and the oracle accuracy has been computed on the pruned pivot alignment. Table 2 presents the oracle accuracies after pruning the pivot alignments using the rank of the transitions.

TABLE 2

| I | Oracle Accuracy |
|---|---|
| 1 | 66.2% |
| 2 | 75.5% |
| 3 | 79.0% |
| 4 | 80.9% |
| ∞ | 86.7% |

In between all two states connected by a transition, only the top I transitions that have the highest posterior probability has been retained when computing the oracle accuracy. For example, if one uses only the two transitions that have the highest posterior probabilities, one can achieve an oracle accuracy of 75.5%. These numbers indicate that, using the top candidates in the pivot alignments instead of just the ASR 1-best hypothesis, it is possible to be more robust to ASR errors. The sizes of the pivot alignments are much smaller than the corresponding lattices. In tests, the size of the pivot alignments is 7% of the size of the lattices.

The method embodiment of the present invention does not require any time information on the input lattice, and the labels of the lattice can be words as well as part of speech tags or parse tags.

Embodiments within the scope of the present invention may also include computer-readable media or tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. Tangible computer-readable media expressly excludes wireless connections, wireless signals, and signals per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, a matrix generated according to the method described above is within the scope of the invention. Further, the data associated with a lattice that may be linearized into a block diagonal matrix may relate to any string of symbols. In the context of language processing, the lattice data may relate to named entities, city names as labels, telephone numbers as labels, or any data related to natural language processing. The linearization process can enable a visualization of a lattice wherein the previously unstructured data can be visualized after linearization in a graphic form. Accordingly, the appended claims and their legal equivalents should only define the invention, rather than any specific examples given.

We claim:

1. A system for generating a block diagonal matrix from a lattice, the system comprising:
    (1) a processor;
    (2) a module configured to control the processor to compute posterior probability of all transitions T in a graph, if a lattice having transitions T is weighted;
    (3) a module configured to control the processor to extract a pivot baseline path from the lattice; and
    (4) a module configured to control the processor to align the transitions T in the lattice with the transitions in the pivot baseline path.

2. The system of claim 1, wherein the graph is a word graph.

3. The system of claim 2, wherein the module configured to control the processor to align the transitions T further, for all transitions T in the topological ordered lattice, further performs the following:
   A. using time slots of transitions T, finding the most overlapping location on the pivot baseline;
   B. if there is no transition at that location that precedes T in the lattice, performing the following:
      i. if a transition with the same label already occurs at that location, adding posterior probability of T to the posterior probability of that transition;
      ii. if a transition with the same label does not already occur at that location, inserting a new transition to that location with the label and posterior probability of T;
   C. if there is a transition at that location that precedes T in the lattice, performing the following:
      i. inserting a new state $S_n$ to the pivot alignment;
      ii. assigning that state a time information;
      iii. changing the destination state of all transitions originating from state $S_s$ to $S_n$; and
      iv. inserting a transition between states $S_n$ and $S_e$ and assigning it the label and posterior of T, wherein the lattice is transformed into a block diagonal matrix.

4. The system of claim 3, wherein the module configured to control the processor to compute posterior probabilities of all transitions T in a word graph further performs a forward and a backward pass through the word graph.

5. The system of claim 3, wherein if the lattice is not weighted, the system skips the step of computing posterior probabilities of all transitions.

6. The system of claim 3, wherein the module configured to control the processor to extract the pivot baseline further extracts the best path from the lattice.

7. The system of claim 3, wherein the module configured to control the processor to extract the pivot baseline further extracts the longest path from the lattice.

8. The system of claim 3, wherein the time slots of transition T comprise a speech interval between starting and ending time frames of T.

9. The system of claim 3, further comprising a module configured to control the processor to apply the probabilities of the block diagonal matrix confidence scores to spoken language understanding.

10. The system of claim 3, further comprising a module configured to control the processor to apply the probabilities of the block diagonal matrix confidence scores to machine translation.

11. The system of claim 3, further comprising a module configured to control the processor to apply the probabilities of the block diagonal matrix confidence scores to named entity extraction.

12. The system of claim 1, wherein the module configured to control the processor to extract the pivot baseline further extracts a random path from the lattice.

13. The system of claim 1, wherein the block diagonal matrix preserves the accuracy of the lattice.

14. The system of claim 1, wherein the block diagonal matrix has the computational property.

15. The system of claim 1, wherein if the lattice is weighted, the system uses the probabilities of the block diagonal matrix as word confidence scores.

16. The system of claim 1, further comprising a module configured to control the processor to use the probabilities of the most probable path of the block diagonal matrix as confidence scores for unsupervised learning of language models.

17. The system of claim 1, further comprising a module configured to control the processor to use the probabilities of the most probable path of the block diagonal matrix as confidence scores for unsupervised learning for automatic speech recognition.

18. The system of claim 1, wherein the block diagonal matrix is smaller in size than the lattice.

19. A system of linearizing a lattice, the system comprising:
   (1) a processor;
   (2) a module configured to control the processor to compute posterior probabilities of all transitions T in a graph, if a lattice having transitions T is weighted;
   (3) a module configured to control the processor to extract a pivot baseline path from the lattice; and
   (4) a module configured to control the processor to linearize the lattice by aligning the transitions T in the lattice with the transitions in the pivot baseline path, wherein the linearized lattice can be visualized.

20. A tangible computer readable medium storing instructions for generating a block diagonal matrix from a lattice, the instructions comprising:
   (1) computing posterior probability of all transitions T in a graph, if a lattice having transitions T is weighted;
   (2) extracting a pivot baseline path from the lattice; and
   (3) aligning the transitions T in the lattice with the transitions in the pivot baseline path.

21. A tangible computer readable medium storing a computer program having instructions for linearizing a lattice, the instructions comprising:
   (1) computing posterior probabilities of all transitions T in a graph, if a lattice having transitions T is weighted;
   (2) extracting a pivot baseline path from the lattice; and
   (3) linearizing the lattice by aligning the transitions T in the lattice with the transitions in the pivot baseline path, wherein the linearized lattice can be visualized.

* * * * *